United States Patent
Wang et al.

(10) Patent No.: US 9,772,343 B2
(45) Date of Patent: Sep. 26, 2017

(54) INERTIA MEASUREMENT MODULE FOR UNMANNED AIRCRAFT

(75) Inventors: Tao Wang, Shenzhen (CN); Tao Zhao, Shenzhen (CN)

(73) Assignee: SZ DJI TECHNOLOGY CO., LTD, Shenzhen (CN)

(*) Notice: Subject to any disclaimer, the term of this patent is extended or adjusted under 35 U.S.C. 154(b) by 211 days.

(21) Appl. No.: 14/241,891

(22) PCT Filed: Sep. 15, 2011

(86) PCT No.: PCT/CN2011/079705
§ 371 (c)(1),
(2), (4) Date: Feb. 28, 2014

(87) PCT Pub. No.: WO2013/029286
PCT Pub. Date: Mar. 7, 2013

(65) Prior Publication Data
US 2014/0224014 A1    Aug. 14, 2014

(30) Foreign Application Priority Data

Sep. 2, 2011 (CN) .......................... 2011 1 0260585

(51) Int. Cl.
*G01P 1/02* (2006.01)
*G01P 15/08* (2006.01)
(Continued)

(52) U.S. Cl.
CPC .............. *G01P 1/003* (2013.01); *B64D 45/00* (2013.01); *F16F 15/00* (2013.01); *G01C 19/16* (2013.01);
(Continued)

(58) Field of Classification Search
CPC ........ G01P 15/14; G01P 15/18; G01P 15/097; G01P 1/02; G01P 1/023; G01P 1/003;
(Continued)

(56) References Cited

U.S. PATENT DOCUMENTS 5,115,291 A    5/1992 Stokes
5,239,866 A *  8/1993 Froidevaux .......... G01D 11/245
                                                    73/430
(Continued)

FOREIGN PATENT DOCUMENTS

CN    1821717 A    8/2006
CN    101349564 A    1/2009
(Continued)

OTHER PUBLICATIONS

Simone Rocca, Comm. pursuant to Art. 94(3) EPC, Jun. 10, 2015, The Hague, Application No./Patent No. 11871565.5-1557.
(Continued)

*Primary Examiner* — Helen Kwok
(74) *Attorney, Agent, or Firm* — Wilson Sonsini Goodrich & Rosati

(57) ABSTRACT

The present disclosure relates to an inertia measurement module for an unmanned aircraft, which comprises a housing assembly, a sensing assembly and a vibration damper. The vibration damper comprises a first vibration-attenuation cushion; and the sensing assembly comprises a first circuit board, a second circuit board and a flexible signal line for connecting the first circuit board and the second circuit board. An inertia sensor is fixed on the second circuit board, and the first circuit board is fixed on the housing assembly. The inertia measurement module further comprises a weight block, and the second circuit board, the weight block, the first vibration-attenuation cushion and the first circuit board are bonded together. The present disclosure greatly reduces the influence of the operational vibration frequency of the unmanned aircraft on the inertia sensor and improves the measurement stability of the inertia sensor.

43 Claims, 5 Drawing Sheets

(51) Int. Cl.
| | |
|---|---|
| G01C 19/56 | (2012.01) |
| G01P 1/00 | (2006.01) |
| F16F 15/00 | (2006.01) |
| G01C 21/16 | (2006.01) |
| B64D 45/00 | (2006.01) |
| G01C 25/00 | (2006.01) |
| G01C 19/16 | (2006.01) |
| G01C 19/5628 | (2012.01) |
| G01C 19/5663 | (2012.01) |
| G01C 19/5769 | (2012.01) |
| G01C 19/5783 | (2012.01) |

(52) U.S. Cl.
CPC ......... *G01C 19/56* (2013.01); *G01C 19/5628* (2013.01); *G01C 19/5663* (2013.01); *G01C 19/5769* (2013.01); *G01C 19/5783* (2013.01); *G01C 21/16* (2013.01); *G01C 25/00* (2013.01); *G01P 1/023* (2013.01); *G01P 15/08* (2013.01); *G01P 15/0802* (2013.01); *B64C 2201/14* (2013.01)

(58) Field of Classification Search
CPC ..... G01P 15/08; G01C 19/56; G01C 19/5783; G01C 19/5719; G01C 19/5769; G01C 19/5607
USPC ................................. 73/493, 504.04, 504.12
See application file for complete search history.

(56) References Cited

U.S. PATENT DOCUMENTS

| | | | | |
|---|---|---|---|---|
| 5,546,644 | A * | 8/1996 | Kakizaki | G01P 1/023 29/25.35 |
| 5,644,081 | A | 7/1997 | Schwarz et al. | |
| 5,668,316 | A * | 9/1997 | Iwai | G01C 19/5663 73/493 |
| 6,145,380 | A * | 11/2000 | MacGugan | G01P 15/097 73/493 |
| 6,578,682 | B2 * | 6/2003 | Braman | G01C 21/16 188/378 |
| 6,880,399 | B1 | 4/2005 | Okoshi et al. | |
| 7,603,903 | B2 * | 10/2009 | Ohta | G01C 19/5719 73/493 |
| 7,891,244 | B2 * | 2/2011 | Ohta | B81B 7/0058 73/493 |
| 7,938,004 | B1 | 5/2011 | Brunsch, Jr. et al. | |
| 7,939,004 | B2 | 5/2011 | Hirayama et al. | |
| 8,826,734 | B2 * | 9/2014 | Ohkoshi | B81B 7/0058 73/493 |
| 2002/0065626 | A1 | 5/2002 | McCall et al. | |
| 2004/0045520 | A1 * | 3/2004 | Slopsema | F02B 75/06 123/192.2 |
| 2007/0074570 | A1 * | 4/2007 | Braman | F16F 15/08 73/504.14 |
| 2007/0113702 | A1 * | 5/2007 | Braman | F16F 15/08 74/574.4 |
| 2009/0308157 | A1 * | 12/2009 | Eriksen | G01C 21/16 73/504.04 |
| 2010/0037694 | A1 * | 2/2010 | Grossman | F16F 15/046 73/526 |
| 2010/0257932 | A1 * | 10/2010 | Braman | G01C 21/16 73/493 |
| 2013/0111993 | A1 * | 5/2013 | Wang | G01C 21/16 73/514.01 |
| 2016/0349280 | A1 | 12/2016 | Wang et al. | |
| 2017/0059319 | A1 | 3/2017 | Feng et al. | |

FOREIGN PATENT DOCUMENTS

| | | |
|---|---|---|
| CN | 101750065 A | 6/2010 |
| CN | 101922938 A | 12/2010 |
| CN | 202274882 U | 6/2012 |
| CN | 102778232 A | 11/2012 |
| CN | 102980584 A | 3/2013 |
| CN | 103210280 A | 7/2013 |
| CN | 203037259 U | 7/2013 |
| CN | 203249935 U | 10/2013 |
| EP | 1788277 A2 | 5/2007 |
| JP | H04297837 A | 10/1992 |
| JP | 2002022761 A | 1/2002 |
| JP | 2007093329 A | 4/2007 |
| JP | 2007163471 A | 6/2007 |
| JP | 2009053005 A | 3/2009 |
| WO | WO 03/029756 A1 | 4/2003 |
| WO | WO-2011140804 A1 | 11/2011 |

OTHER PUBLICATIONS

Simone Rocca, Supplemental European Search Report, dated Mar. 16, 2015, The Hague, Application No./Patent No. 11871565.5-1557 / 2752643.
Keisuke Azetu, Office Action, dated Jan. 22, 2015, in JP 2014-527461.
First Office Action from SIPO dated Mar. 3, 2016 with its English Translation.
U.S. Appl. No. 15/231,674, filed Aug. 8, 2016, Wang et al.
International search report and written opinion dated Dec. 22, 2011 for PCT/CN2011/079705.
Office action dated Oct. 3, 2016 for U.S. Appl. No. 15/231,674.
Co-pending U.S. Appl. No. 15/349,980, filed Nov. 11, 2016.
"International search report with written opinion dated Jan. 20, 2016 for PCT/CN2015/076012".
"Office action dated Jan. 23, 2017 for U.S. Appl. No. 15/349,980".
Office action dated Mar. 1, 2017 for U.S. Appl. No. 15/231,674.
Dayou. Noise and Vibration Control Engineering Handbook. China Machine Press, 2002. pp. 577-579.
Harris, et al. Shock and Vibration Handbook. Science Press, Dec. 1990. pp. 2, 19, 606, 610, and 611.
Notice of allowance dated Mar. 30, 2017 for U.S. Appl. No. 15/231,674.
Zhu, et al. College Physics. Textbook Series in Physics for Higher Education. Tsinghua University Press, 2004. p. 211-223.
Office action dated May 25, 2017 for U.S. Appl. No. 15/231,674.
Office action dated Jun. 16, 2017 for U.S. Appl. No. 15/349,980.

* cited by examiner

INERTIA MEASUREMENT MODULE FOR UNMANNED AIRCRAFT

FIELD

The present disclosure generally relates to the technical field of unmanned aircraft control, and more particularly, to an inertia measurement module for an unmanned aircraft.

BACKGROUND

In the conventional technology, for buffering of an inertia measurement module of an unmanned aircraft, four vibration-attenuation cushions are disposed outside a housing of a control module thereof to form four fulcrums that support the housing of the whole control module. The structure of disposing the vibration-attenuation cushions outside the inertia measurement module for the unmanned aircraft has following drawbacks: (1) the vibration-attenuation cushions need be stalled on a platform, so that both the volume and weight of the whole control module are increased, which increases the invalid load of the aircraft and makes it inconvenient to be installed; (2) because the vibration-attenuation cushions are exposed outside, there is a probability that the vibration-attenuation cushions might be damaged, and this has an influence on the service life of the inertia measurement module for the unmanned aircraft; and (3) the buffering effect might be compromised by the main control connections.

SUMMARY

The technical problem to be solved by the present disclosure is that, in view of the problem that disposing the vibration-attenuation cushions outside leads to a bulky volume and a poor buffering effect of the conventional inertia measurement module for the unmanned aircraft, an inertia measurement module for an unmanned aircraft is provided to solve this problem. A technical solution of the present disclosure to solve this technical problem is: providing an inertia measurement module for an unmanned aircraft, which comprises a housing assembly, a sensing assembly and a vibration damper. The sensing assembly and the vibration damper are disposed in the housing assembly. The vibration damper comprises a first vibration-attenuation cushion for buffering vibrations; the sensing assembly comprises a first circuit board, a second circuit board and a flexible signal line for communicationally connecting the first circuit board and the second circuit board. An inertia sensor is fixedly disposed on the second circuit board, and the first circuit board is fixed on the housing assembly. The inertia measurement module further comprises a weight block for increasing weight, and the second circuit board, the weight block, the first vibration-attenuation cushion and the first circuit board are bonded together in sequence into one piece and then fitted into the housing assembly.

Furthermore, in the inertia measurement module for the unmanned aircraft of the present disclosure, the vibration damper further comprises a second vibration-attenuation cushion, which is fixedly bonded on the second circuit board and abuts against an inner wall of the housing assembly.

Preferably, in the inertia measurement module for the unmanned aircraft of the present disclosure, a bonding area $S_2$ between the second vibration-attenuation cushion and the second circuit board is in a range of 12.6 to 50.2 $mm^2$.

Preferably, in the inertia measurement module for the unmanned aircraft of the present disclosure, the weight block has a weight of 1 g to 30 g.

Preferably, in the inertia measurement module for the unmanned aircraft of the present disclosure, a bonding area $S_1$ between the first vibration-attenuation cushion and the second circuit board is in a range of 12.6 to 50.2 $mm^2$.

Specifically, in the inertia measurement module for the unmanned aircraft of the present disclosure, the housing assembly comprises a first housing and a second housing mating with and locked to each other.

Specifically, in the inertia measurement module for the unmanned aircraft of the present disclosure, the second circuit board is fixedly disposed on a supporting sheet, and the supporting sheet is fixedly bonded to the weight block.

Preferably, in the inertia measurement module for the unmanned aircraft of the present disclosure, the inertia sensor comprises a gyroscope for detecting an angular speed signal and an accelerometer for detecting an acceleration signal, the angular speed signal and the acceleration signal are transmitted to the first circuit board via the flexible signal line.

Specifically, in the inertia measurement module for the unmanned aircraft of the present disclosure, a power source, a memory, a processor and a circuit module are fixedly disposed on the first circuit board.

Specifically, in the inertia measurement module for the unmanned aircraft of the present disclosure, the sensing assembly further comprises a signal input interface terminal and a signal output interface terminal, the signal input interface terminal and the signal output interface terminal are connected to the first circuit board through interface signals; and the housing assembly forms an inner chamber that opens at two ends, and the signal input interface terminal and the signal output interface terminal are disposed in the inner chamber and snap-fitted to the two ends of the inner chamber.

The present disclosure has following advantages: components including the inertia sensor and so on that require a high vibration performance, are integrated on the second circuit board, and the vibration damper is disposed to improve the vibration characteristics of the inertia measurement module so that the inherent mechanical vibration frequency of the inertia measurement module is much lower than various vibration frequencies unrelated to movement that are generated by the aircraft. By disposing the first vibration-attenuation cushion, vibrations caused by the unmanned aircraft to the inertia sensor are attenuated quickly, and when frequencies of above 50 Hz are generated by the aircraft, the vibrations suffered by the inertia sensor after the vibration-attenuation cushion is disposed, are attenuated to below 30% of those suffered before the vibration-attenuation cushion is disposed. This greatly reduces the influence of the operational vibration frequency of the unmanned aircraft on the inertia sensor and improves the measurement stability of the inertia sensor; and this also remarkably reduces the volume and weight of the inertia measurement module and enlarges the loading space of the unmanned aircraft.

BRIEF DESCRIPTION OF THE DRAWINGS

Hereinbelow, the present disclosure will be further described with reference to the attached drawings and the embodiments thereof, in which.

DETAILED DESCRIPTION

In order to provide a clearer understanding of the technical features, objects and effects of the present disclosure, embodiments of the present disclosure will be detailed with reference to the attached drawings hereinbelow.

Violent random vibrations are the primary mechanics factor to which a strapdown inertial navigation module is exposed in operation. The vibrations lead to instability in performance of the inertia measurement module or damage of electronic components, and have a great influence on the stability of the inertia measurement module. In order to reduce the damage of components on the circuit board or the instability of the inertia sensor due to violent random vibrations of the unmanned aircraft, the influence of vibrations of the unmanned aircraft on the inertia sensor may be reduced by, on one hand, altering the connecting structures between parts within the housing assembly to enhance the connection rigidity between the parts and, on the other hand, using a vibration damper as a damping medium to elastically connect the inertia measurement module to the unmanned aircraft. The choice of the buffering mode has an influence not only on the buffering performance of the inertial navigation system but also on the measurement accuracy of the system. Accordingly, the present disclosure seeks to improve performances of the miniature inertia measurement module by improving the vibration damper and rationalizing the buffering mechanic structure.

Figure 1:
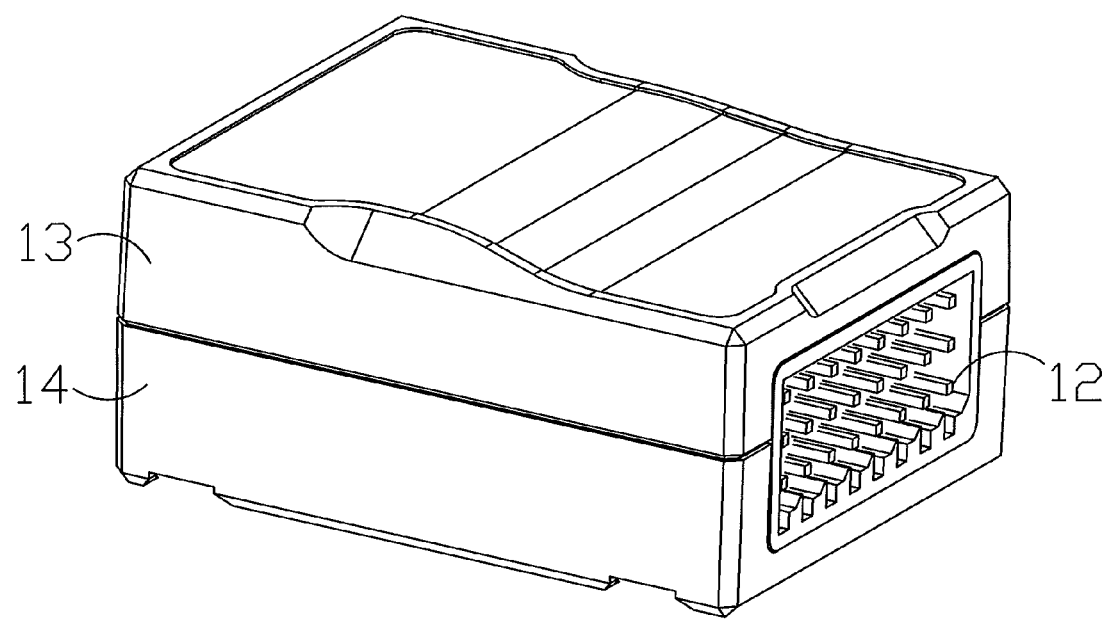
FIG. 1 is a schematic structural view of an inertia measurement module for an unmanned aircraft according to an embodiment of the present disclosure in an assembled state.
Figure 2:
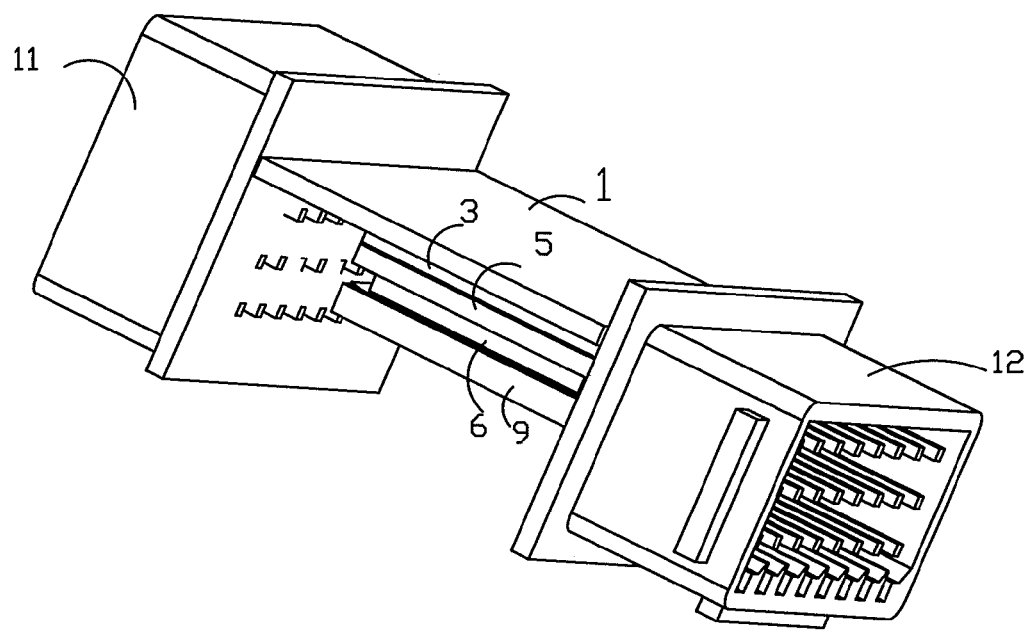
FIG. 2 is a first schematic structural view of the inertia measurement module for an unmanned aircraft according to an embodiment of the present disclosure when a housing assembly is removed.
Figure 3:
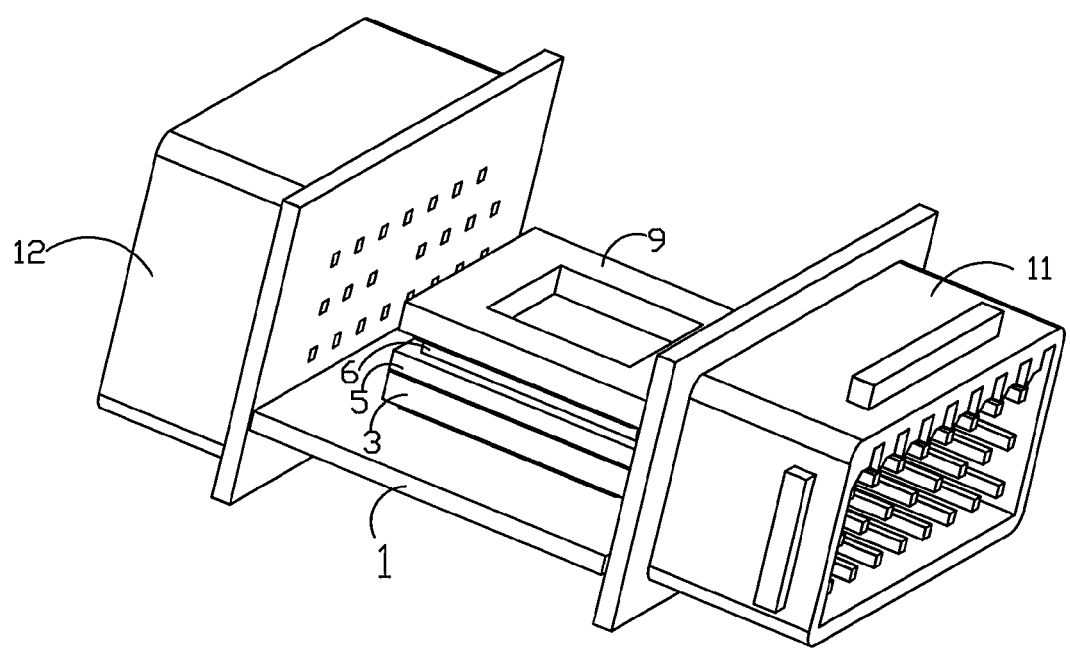
FIG. 3 is a second schematic structural view of the inertia measurement module for an unmanned aircraft according to an embodiment of the present disclosure when the housing assembly is removed.
Figure 4:
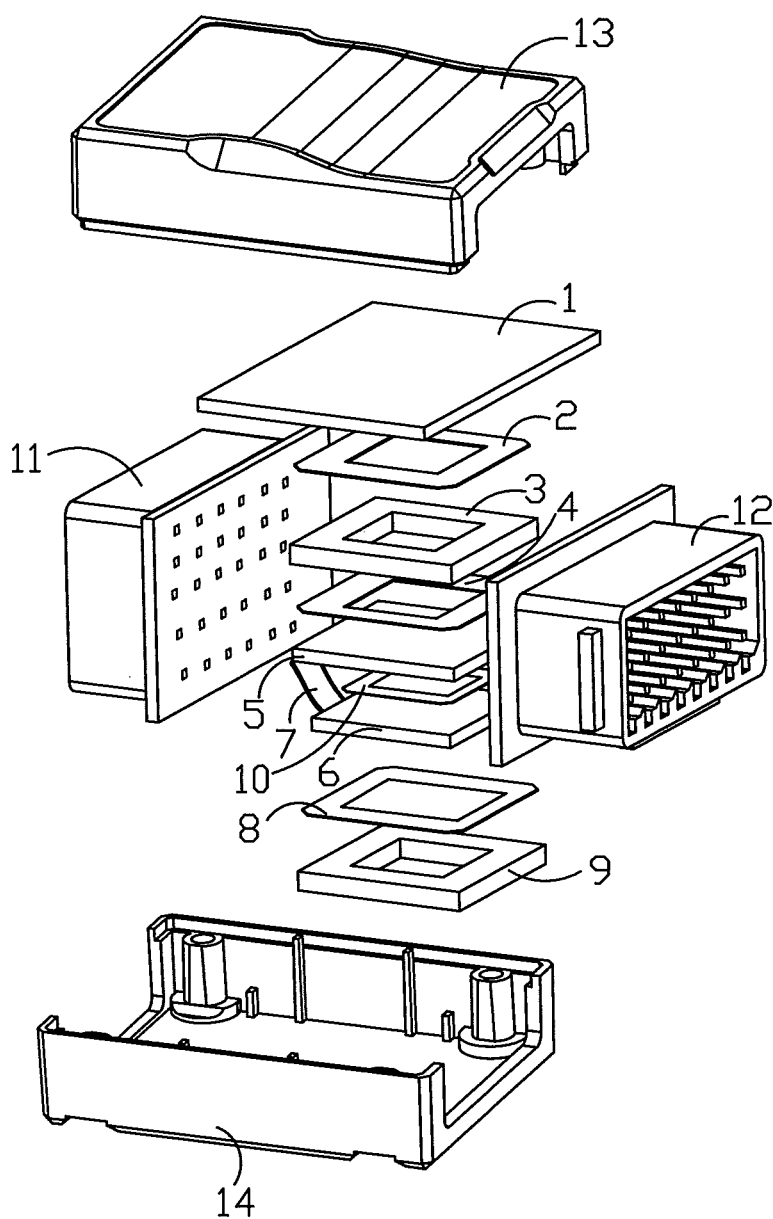
FIG. 4 is a first schematic exploded structural view of the inertia measurement module for an unmanned aircraft according to an embodiment of the present disclosure.
Figure 5:
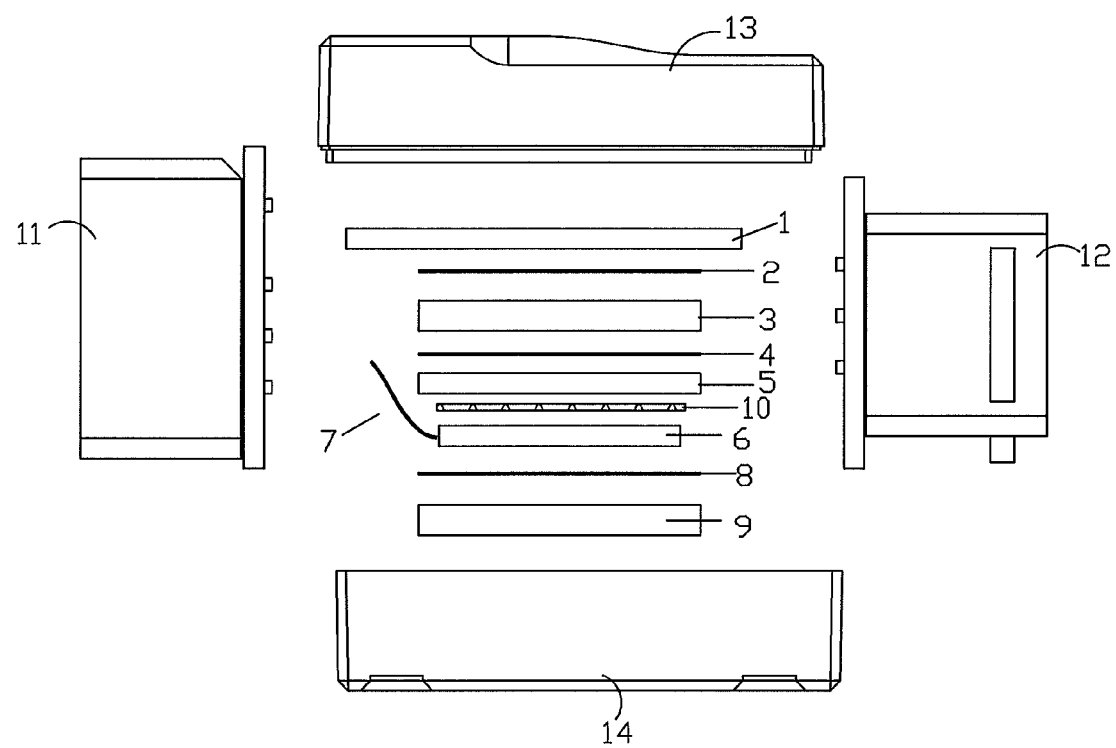
FIG. 5 is a second schematic exploded structural view of the inertia measurement module for an unmanned aircraft according to an embodiment of the present disclosure.

As shown in FIG. 1, FIG. 2 and FIG. 3, an inertia measurement module for an unmanned aircraft according to an embodiment of the present disclosure is shown therein. The inertia measurement module for an unmanned aircraft comprises a housing assembly, a sensing assembly and a vibration damper. As shown in FIG. 1, FIG. 4 and FIG. 5, the housing assembly forms an inner chamber that opens at two ends, and the sensing assembly and the vibration damper are disposed within the inner chamber. As shown in FIG. 4 and FIG. 5, the sensing assembly comprises a first circuit board 1, a second circuit board 6 and a flexible signal line 7 for connecting the first circuit board 1 and the second circuit board 6. The flexible signal line 7 is adapted to transmit various signals detected by sensors on the second circuit board 6 to the first circuit board 1. Components including an inertia sensor and a power source are fixedly disposed on the second circuit board 6. The components that require high vibration performances such as the inertia sensor etc. are integrated into the second circuit board 6, to perform to buffer the inertia sensor by buffering the second circuit board 6, so as to improve the measurement stability of the inertia sensor. To facilitate buffering the second circuit board 6, preferably, the second circuit board 6 is a flexible circuit board. In order to protect the inertia sensor and reduce the influence of vibrations of the unmanned aircraft to the inertia sensor, the vibration damper comprises a first vibration-attenuation cushion 3 for buffering the vibrations as shown in FIG. 4 and FIG. 5. As the first vibration-attenuation cushion 3 is used for buffering the sensing assembly, the size, the density and the material of the first vibration-attenuation cushion 3 and the bonding area between the first vibration-attenuation cushion 3 and the sensing assembly have a great influence on the buffering performances. Preferably, the first circuit board 1 is fixed on the housing assembly by snap-fitting, screwing, riveting, soldering or adhesion. In the inertia measurement module, the inherent frequency thereof is $$f_n = \frac{1}{2\pi}\sqrt{\frac{K}{M}},$$

where K represents the elastic coefficient, and M represents the mass. It can be seen, the greater the mass M is, thus the smaller the inherent frequency $f_n$ will be. To keep the inherent frequency away from the operation frequency of the unmanned aircraft, that is 50 Hz~200 Hz, the inherent frequency $f_n$ shall be as small as possible and, as can be derived from the above formula, this requires increasing the mass M or decreasing the elastic coefficient K. The elastic coefficient K is affected by the material of the vibration damper and the bonding area thereof, and when the elastic coefficient K is a constant value, the inherent frequency $f_n$ shall be decreased by increasing the mass M. In order to increase the mass M, a weight block 5 for increasing the mass is further included in this embodiment, as shown in FIG. 4 and FIG. 5. The weight block 5 serves to, on one hand, decrease the inherent frequency of the inertia measurement module and, on the other hand, provide a support for positioning the second circuit board 6 so that the parts are connected firmly. As shown in FIG. 4 and FIG. 5, the second circuit board 6 is fixedly bonded to a side surface of the weight block 5, the opposite side surface of the weight block 5 is fixedly bonded to the first vibration-attenuation cushion 3 through an adhesive layer 4, the first vibration-attenuation cushion 3 is bonded to the first circuit board 1 through an adhesive layer 2, and the first circuit board 1 is snap-fitted into the housing assembly. That is, the second circuit board 6, the weight block 5, the first vibration-attenuation cushion 3 and the first circuit board 1 are bonded together in sequence into one piece and then snap-fitted into the housing assembly.

Specifically, as an embodiment of the present disclosure, the vibration damper is made of a special buffering material which has an excellent elastic performance. This can provide the following advantages: by disposing the vibration damper, the vibrations caused by the unmanned aircraft to the inertia sensor can be attenuated quickly, and when frequencies of above 50 Hz are generated by the unmanned aircraft, the vibrations suffered by the inertia sensor after the vibration damper is disposed are attenuated to below 30% of those suffered before the vibration damper is disposed. This greatly reduces the influence of the operational vibration frequency of the unmanned aircraft on the inertia sensor and improves the measurement stability of the inertia sensor.

In order to further provide buffering for the inertia sensor on the basis of the above technical solution so that buffering can be achieved at both the two opposite sides of the second circuit board 6, the vibration damper further comprises a second vibration-attenuation cushion 9 as shown in FIG. 4 and FIG. 5. The second vibration-attenuation cushion 9 is fixedly bonded to the second circuit board 6 and abuts against an inner wall of the housing assembly. The second vibration-attenuation cushion 9 and the first vibration-attenuation cushion 3 are located at two sides of the second circuit board 6 respectively so that forced vibrations caused by the unmanned aircraft from different directions can be absorbed in a balanced way by the two vibration-attenuation cushions. Thus, when the unmanned aircraft flips over, makes a turn, ascends or descends in the air, the inertia sensor on the second circuit board 6 can be well protected with a better buffering effect.

Further, as shown in FIG. 4, the second vibration-attenuation cushion 9 is in the form of a hollow cuboid, which has a length of 13 mm~20 mm, a width of 13 mm~20 mm and a thickness of 3 mm~4 mm. It can be appreciated that, the hollow part of the second vibration-attenuation cushion 9 is not limited to be the cuboidal form shown in FIG. 4, but may also be a circular form, an ellipsoidal form, a rhombus form, a quincuncial form or some other regular form. Preferably, the hollow part is in the

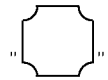

form, which is favorable for improving the elasticity of the second vibration-attenuation cushion 9 to enhance the buffering effect. It shall be noted that, the form of the second vibration-attenuation cushion 9 is not limited to the cuboidal form either, but may also be some other regular or irregular form. Preferably, the second vibration-attenuation cushion 9 is in a sheet form for ease of installation.

A multitude of tiny cavities are distributed in the elastic material, and the size and quantity of the cavities have an influence on the performance of the elastic material. The second vibration-attenuation cushion 9 is fixedly bonded to the second circuit board 6 through an adhesive layer 8, and in order to ensure secure bonding, theoretically the bonding area $S_2$ of the adhesive layer 8 shall be as large as possible. However, if the bonding area $S_2$ is too large, the cavities in the elastic material would be blocked by the adhesive layer, and in case the cavities were blocked in a large area in the elastic material, the elasticity of the elastic material would be significantly compromised (i.e., the elastic coefficient K would be increased) to lead to a correspondingly increased $$f_n = \frac{1}{2\pi}\sqrt{\frac{K}{M}}.$$

Therefore, the area of the adhesive layer 8 shall be set to an appropriate size, and the bonding area $S_2$ between the second vibration-attenuation cushion 9 and the second circuit board 6 is preferably in a range of 12.6 to 50.2 mm$^2$ and, more preferably, is 28.3 mm$^2$.

The inherent frequency is $$f_n = \frac{1}{2\pi}\sqrt{\frac{K}{M}},$$

so in order to reduce the inherent frequency as far as possible on the basis of the above technical solution, the weight of the weight block is 1 g~30 g and, preferably, is 15 g, 17.5 g, 20 g or 25 g.

Further, the weight block 5 is made of a metal material having a relatively large density, and is in the form of a cuboid that can save use of space. The cuboid has a length of 13 mm~15 mm, a width of 13 mm~15 mm and a thickness of 3 mm~5 mm. Preferably, the weight block 5 has a length of 15 mm, a width of 15 mm and a height of 4 mm to ensure a good stability. It shall be noted that, the form of the weight block 5 is not limited to the cuboidal form, but may also be some other regular or irregular form. Preferably, the weight block 5 is in a sheet form or a lump form to facilitate tight connection with the second circuit board 6.

In order to reduce the volume of the inertia measurement module and decrease the height of the measurement module on the basis of the above technical solution, preferably a recess that matches in shape with the second circuit board 6 is formed on the weight block 5. The second circuit board 6 is embedded into the recess and fixed with the weight block 5 through adhesion. Embedding the second circuit board 6 into the recess of the weight block 5 can, on one hand, save use of the space and, on the other hand, facilitate quick and uniform dissipation of heat from the second circuit board 6 because of its close attachment to the metallic weight block 5. This can effectively avoid overheating in local regions of the second circuit board 6 to prolong the service life of components of the second circuit board 6.

Similarly, as shown in FIG. 4, the first vibration-attenuation cushion 3 is in the same form as the second vibration-attenuation cushion 9. Specifically, the first vibration-attenuation cushion 3 is in the form of a hollow cuboid, which has a length of 13 mm~20 mm, a width of 13 mm~20 mm and a thickness of 3 mm~4 mm. It can be appreciated that, the hollow part of the first vibration-attenuation cushion 3 is not limited to be the cuboidal form shown in FIG. 4, but may also be a circular form, an ellipsoidal form, a rhombus form, a quincuncial form or some other regular form. Preferably, the hollow part is of a

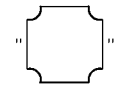

form, which is favorable for improving the elasticity of the first vibration-attenuation cushion 3 to enhance the buffering effect. Similarly, the shape of the first vibration-attenuation cushion 3 is not limited to the cuboidal form either, but may also be some other regular or irregular form. Preferably, the first vibration-attenuation cushion 3 is in a sheet form to facilitate close attachment to the weight block 5. Further, a multitude of tiny cellular cavities are distributed in the elastic material, and the size and quantity of the cavities have an influence on the performance of the elastic material. The first vibration-attenuation cushion 3 is fixedly bonded to the first circuit board 1 through an adhesive layer 2, and in order to ensure secure bonding, theoretically the bonding area $S_1$ of the adhesive layer 2 shall be as large as possible. However, if the bonding area $S_1$ is too large, the cavities in the elastic material would be blocked by the adhesive layer 2, and in case the cavities were blocked in a large area in the elastic material, the elasticity of the elastic material would be significantly compromised (i.e., the elastic coefficient K would be increased) to lead to a correspondingly increased $$f_n = \frac{1}{2\pi}\sqrt{\frac{K}{M}}.$$

Therefore, the area of the adhesive layer 2 shall be set to an appropriate size, and the bonding area $S_1$ between the first vibration-attenuation cushion 3 and the first circuit board 1 is preferably in a range of 12.6 to 50.2 mm² and, more preferably, is 28.3 mm².

Referring to FIG. 1, FIG. 4 and FIG. 5, as a preferred embodiment of the present disclosure on the basis of the above technical solution, the housing assembly comprises a first housing 13 and a second housing 14 mating with and locked to each other, and the first housing 13 and the second housing 14 are snap-fitted with each other to form an inner chamber. Such a structure is favorable for assembly and detachment, and allows for maintaining parts inside the housing assembly timely.

Preferably, the first housing 13 and the second housing 14 are locked to each other by screws. It shall be appreciated that, the first housing 13 and the second housing 14 may also be locked to each other through riveting, snap-fitting or plugging.

On the basis of the above technical solution, the flexible second circuit board 6 is preferably fixed on a supporting sheet as shown in FIG. 5. The supporting sheet is fixedly bonded to the weight block through an adhesive layer 10, and serves to facilitate tight bonding between the second circuit board 6 and the weight block 5.

On the basis of the above technical solution, the adhesive layer 10, the adhesive layer 2, the adhesive layer 8 and the adhesive layer 4 are made of a special material that has good adhesiveness, good resistance to repel and good workability. This kind of adhesive layers may be controlled to be within 0.15 mm in thickness and to provide an adhesive force of 14~17 N/20 mm. It can be appreciated that, the aforesaid adhesive layers may be in sheet form (i.e., surface bonding) or be formed by a plurality of individual portions (i.e., multi-point bonding).

Specifically, a power source, a memory, a processor and a circuit module are fixedly disposed on the first circuit board 1. The inertia sensor comprises a gyroscope for detecting an angular speed signal and an accelerometer for detecting an acceleration signal. The angular speed signal and the acceleration signal are transmitted to the first circuit board 1 via the flexible signal line 7, and are then processed in the memory and the processor for output to control the steering engine of the unmanned aircraft.

Further, as shown in FIG. 1, FIG. 2 and FIG. 3, the sensing assembly further comprises a signal input interface terminal 11 and a signal output interface terminal 12 which are connected to the first circuit board 1 via interface signals. In this embodiment, both the signal input interface terminal 11 and the signal output interface terminal 12 are connected to the first circuit board 1 preferably in an asynchronous serial manner. As shown in FIG. 1, the housing assembly forms an inner chamber that opens at two ends, and the signal interface terminal 11 and the signal output interface terminal 12 are disposed within the inner chamber and snap-fitted to the two ends of the inner chamber. Such a structure is compact and occupies a small space.

Embodiments of the present disclosure have been described above with reference to the attached drawings. However, the present disclosure is not limited to the aforesaid embodiments, and the aforesaid embodiments are provided only for illustration but not for limitation. In light of the present disclosure, those of ordinary skill in the art can make numerous modifications without departing from the spirit of the present disclosure and the scope claimed in the claims, and all these modifications shall fall within the scope of the present disclosure.

What is claimed is:

1. An inertia measurement module for an unmanned aircraft, comprising:
    a sensing assembly comprising:
        a first circuit board;
        a second circuit board comprising at least one inertia sensor; and
        a flexible signal line that connects the first circuit board to the second circuit board;
    a weight block comprising a first surface and a second surface opposite the first surface, wherein a recess is (1) formed only on the second surface, and (2) configured to support the second circuit board that is embedded in the recess;
    a first vibration-attenuation cushion and a second vibration-attenuation cushion arranged on opposite sides of the weight block, wherein the first vibration-attenuation cushion is provided as a sheet extending between the first surface of the weight block and the first circuit board, and wherein the second vibration-attenuation cushion abuts against the second circuit board via an adhesive layer; and
    a housing assembly comprising a chamber configured to support the sensing assembly, the weight block, and the first vibration-attenuation cushion and second vibration-attenuation cushion therein.

2. The inertia measurement module of claim 1, wherein the second vibration-attenuation cushion is separated from the second circuit board via the adhesive layer.

3. The inertia measurement module of claim 1, wherein the adhesive layer is attached onto the second circuit board.

4. The inertia measurement module of claim 1, wherein the first and second vibration-attenuation cushions are arranged on the opposite sides of the weight block along a vertical axis extending longitudinally through the weight block.

5. The inertia measurement module of claim 1, wherein the first circuit board is rigidly affixed to an inner portion of the housing assembly, a first side of the second vibration-attenuation cushion abuts against the second circuit board, and a second side of the second vibration-attenuation cushion abuts against another inner portion of the housing assembly.

6. The inertia measurement module of claim 1, wherein the first circuit board is arranged outside of the recess of the weight block.

7. The inertia measurement module of claim 1, wherein the recess is dimensioned to match a shape of the second circuit board, and wherein a distance between the first surface and the first circuit board is less than a distance between the second surface and the first circuit board.

8. The inertia measurement module of claim 1, wherein at least one of the first and second vibration-attenuation cushions is made of a buffering material having a predefined elasticity.

9. The inertia measurement module of claim 1, wherein the weight block is made of a metallic material.

10. The inertia measurement module of claim 1, wherein the weight block is dimensioned to take a shape of a cuboid.

11. The inertia measurement module of claim 1, wherein the second circuit board is disposed on a supporting sheet that is bonded to the weight block.

12. The inertia measurement module of claim 1, wherein at least one of the first and second vibration-attenuation cushions is made of an elastic material comprising a plurality of cavities.

13. The inertia measurement module of claim 1, wherein the first vibration-attenuation cushion and the second vibration-attenuation cushion are adapted to absorb vibrations on opposite sides of the second circuit board.

14. The inertia measurement module of claim 1, wherein the second circuit board is a flexible circuit board.

15. The inertia measurement module of claim 1, wherein the inertia sensor comprises at least one of the following: a gyroscope for obtaining an angular speed signal of the unmanned aircraft, and an accelerometer for obtaining an acceleration signal of the unmanned aircraft.

16. The inertia measurement module of claim 15, wherein the angular speed signal and the acceleration signal are transmitted from the second circuit board to the first circuit board via the flexible signal line.

17. The inertia measurement module of claim 1, wherein the second circuit board further comprises a power source.

18. The inertia measurement module of claim 1, wherein a size of the second circuit board is smaller than a size of the first circuit board.

19. The inertia measurement module of claim 1, wherein the sensing assembly further comprises a signal input interface terminal and a signal output interface terminal respectively operably coupled to opposing sides of the first circuit board.

20. The inertia measurement module of claim 1, wherein a shape of the first vibration-attenuation cushion is substantially the same as a shape of the second vibration-attenuation cushion.

21. The inertia measurement module of claim 1, wherein the first vibration-attenuation cushion is configured to absorb vibrations on a first side of the second circuit board, and wherein the second vibration-attenuation cushion is configured to absorb vibrations on a second side of the second circuit board that is opposite to the first side of the second circuit board.

22. The inertia measurement module of claim 1, wherein a contact area between the second vibration-attenuation cushion and the second circuit board ranges from about 12.6 mm$^2$ to 50.2 mm$^2$.

23. The inertia measurement module of claim 1, wherein a contact area between the second vibration-attenuation cushion and the second circuit board is about 28 mm$^2$.

24. The inertia measurement module of claim 1, wherein at least one of the first and second vibration-attenuation cushions has a length of about 13 mm to 20 mm, a width of about 13 mm to 20 mm, and a thickness of about 3 mm to 4 mm.

25. The inertia measurement module of claim 1, wherein the weight block has a weight of about 1 g to 30 g.

26. The inertia measurement module of claim 19, wherein the opposing sides of the first circuit board are different from a surface of the first circuit board that is rigidly affixed to an inner portion of the housing assembly.

27. The inertia measurement module of claim 1, wherein the sensing assembly, the weight block, and the first and second vibration-attenuation cushions are rigidly supported within and by the housing assembly.

28. An inertia measurement module for an unmanned aircraft, comprising:
 a sensing assembly comprising:
  a first circuit board;
  a second circuit board comprising at least one inertia sensor; and
  a flexible signal line that connects the first circuit board to the second circuit board;
 a weight block comprising a first surface and a second surface opposite the first surface, wherein a recess is (1) formed only on the second surface, and (2) configured to support the second circuit board such that the second circuit board is embedded in said recess;
 a first vibration-attenuation cushion and a second vibration-attenuation cushion arranged on opposite sides of the weight block, wherein the first vibration-attenuation cushion is provided as a sheet extending between the first surface of the weight block and the first circuit board, and wherein the second vibration-attenuation cushion abuts against the second circuit board via an intermediate layer; and
 a housing assembly comprising a chamber configured to support the sensing assembly, the weight block, and the first vibration-attenuation cushion and the second vibration-attenuation cushion therein.

29. The inertia measurement module of claim 28, wherein the intermediate layer is in direct contact with at least one of the second vibration-attenuation cushion and the second circuit board.

30. The inertia measurement module of claim 28, wherein the recess is dimensioned to take a shape and a size of the second circuit board, and wherein a distance between the first surface and the first circuit board is less than a distance between the second surface and the first circuit board.

31. The inertia measurement module of claim 28, wherein a portion of the intermediate layer is on the second circuit board and embedded in said recess.

32. The inertia measurement module of claim 28, wherein the first circuit board is rigidly affixed to an inner portion of the housing assembly, a first side of the second vibration-attenuation cushion abuts against the second circuit board, and a second side of the second vibration-attenuation cushion abuts against another inner portion of the housing assembly.

33. The inertia measurement module of claim 28, wherein the intermediate layer is bonded to at least one of the second circuit board or the second vibration-attenuation cushion.

34. The inertia measurement module of claim 33, wherein the intermediate layer is bonded to the second circuit board.

35. The inertia measurement module of claim 33, wherein a size of a bonding area occupied by the intermediate layer ranges from about 12.6 mm$^2$ to 50.2 mm$^2$.

36. The inertia measurement module of claim 33, wherein the intermediate layer is an adhesive layer that is provided in a sheet form designed for surface bonding to at least one of the second circuit board or the second vibration-attenuation cushion.

37. The inertia measurement module of claim 1, wherein the first circuit board is located further away from the weight block compared to the second circuit board, and wherein the first circuit board abuts against the weight block via at least the first vibration-attenuation cushion.

38. The inertia measurement module of claim 37, further comprising a signal input interface terminal and a signal output interface terminal respectively operably coupled to opposing sides of the first circuit board.

39. The inertia measurement module of claim 28, wherein the first circuit board is rigidly affixed to an inner top portion of the housing assembly, and one side of the second vibration-attenuation cushion abuts against a bottom inner portion of the housing assembly.

40. The inertia measurement module of claim 39, wherein the sensing assembly, the weight block, and the first and second vibration-attenuation cushions are rigidly supported within and by the housing assembly.

41. The inertia measurement module of claim 40, wherein at least the first circuit board or the second circuit board is not permitted to move relative to the housing assembly during operation of the unmanned aircraft.

42. The inertia measurement module of claim 37, wherein the first circuit board is bonded to one side of the weight block via the first vibration-attenuation cushion and one or more adhesive layers, and wherein the second circuit board is attached to a supporting sheet that is bonded to the recess on an opposite side of the weight block, such that the first circuit board and the second circuit board are not permitted to move relative to the weight block during operation of the unmanned aircraft.

43. The inertia measurement module of claim 42, wherein the first circuit board and the second circuit board are not permitted to move relative to each other during the operation of the unmanned aircraft.

\* \* \* \* \*